Aug. 4, 1942.  N. E. WAHLBERG ET AL  2,291,851
JAW CLUTCH
Filed May 16, 1940
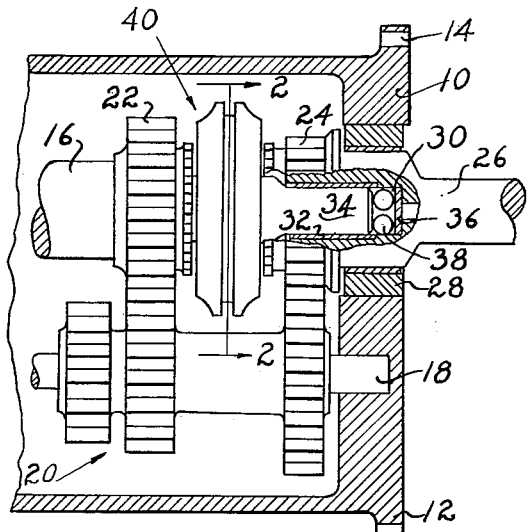
Fig. 1
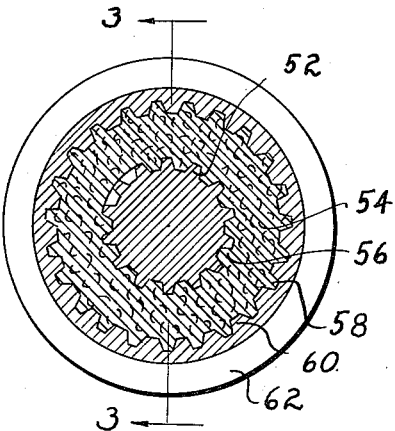
Fig. 2
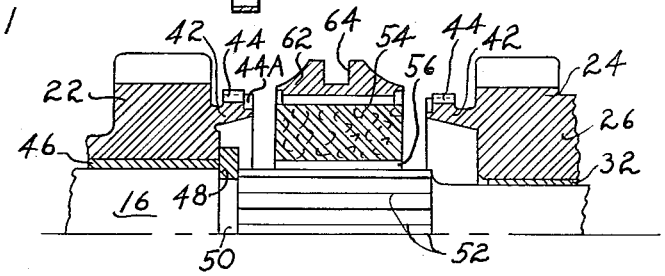
Fig. 3
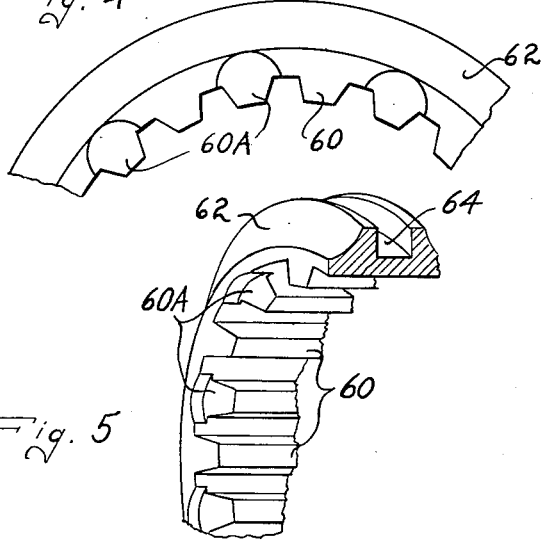
Fig. 4
Fig. 5
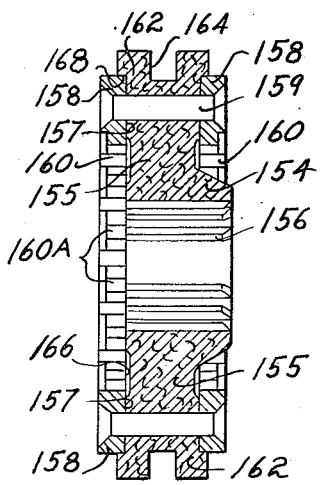
Fig. 6
INVENTOR.
NILS ERIC WAHLBERG
FLOYD F. KISHLINE.
BY Carl J. Barbee
ATTORNEY.

Patented Aug. 4, 1942

2,291,851

UNITED STATES PATENT OFFICE 2,291,851

JAW CLUTCH

Nils Erik Wahlberg and Floyd F. Kishline, Kenosha, Wis., assignors to Nash-Kelvinator Corporation, Kenosha, Wis., a corporation of Maryland Application May 16, 1940, Serial No. 335,466

5 Claims. (Cl. 192—67)

This invention relates to transmissions and has particular reference to means for engaging different gear ratios in an automotive transmission.

It is an object of this invention to provide means whereby the shifting of gears in a transmission will be facilitated.

It is another object of this invention to provide means for quieting the operation of a transmission, particularly while the gears are being shifted.

It is another object of this invention to provide vibration absorbing material in the path of power transmission in a transmission.

Further objects and advantages of this invention will be apparent from a consideration of the following description and attached drawing of which there is one sheet and in which Figure 1 represents a vertical sectional view, partially broken away, through an automotive transmission.

Figure 2 represents a sectional view taken on a plane indicated by the line 2—2 in Figure 1 and looking in the direction of the arrows;

Figure 3 is a sectional view taken along the plane indicated by the line 3—3 of Figure 2 and looking in the direction of the arrows;

Figure 4 is an enlarged elevational view of a portion of the shift collar illustrated in Figures 1, 2 and 3;

Figure 5 is a perspective view of that portion of the shift collar illustrated in Figure 4; and, Figure 6 is a sectional view through a modified type of shift collar embodying the invention.

In Figure 1 there is illustrated the usual type of automotive transmission known to the art today, having a case 10 provided with a flange 12 on its forward wall, which flange is apertured as at 14 so that the case may be bolted to a clutch housing. The transmission within the case 10 consists of a main shaft 16 and a countershaft 18 which is fast in the walls of the case 10. Rotatively supported upon the countershaft 18 is the usual countershaft gear cluster generally indicated at 20, the gears of which are in constant mesh with gears 22 rotatively supported upon the main shaft 16 and with a gear 24 formed on a clutch shaft 26. The clutch shaft 26 is journaled in a bearing 28 supported in the forward wall of the transmission case 10 and is provided with a hole 30 in its end within which is positioned a sleeve of bearing material 32 for rotatively supporting the forward end 34 of the main shaft 16. We have also provided a thrust disc 36 and ball bearings 38 between the forward end of the hole 30 and the end portion 34 of the main shaft 16 for bearing the thrust of the main shaft 16.

Generally indicated at 40 is a jaw clutch by means of which the main shaft 16 is selectively connected either directly to the clutch shaft 26 for a direct drive connection or to the gear 22 for a second speed drive through the countershaft gear cluster 20. Our invention deals with the novel construction of the jaw clutch 40 which is most clearly illustrated in Figures 2 and 3.

Formed on the forward face of the gear 22 and on the rear face of the gear 24 are annular flanges 42. Cut around the outer surface of the flanges 42 are the external or male teeth elements 44 of the jaw clutch 40. It will be noted that the gear 22, which is rotatively supported on the main shaft 16 by the sleeve of bearing material 46, is held against axial movement along the shaft 16 by means of snap rings, one of which appears at 48, fitted within a groove 50 cut in the shaft 16. The gear 22 is thus held in spaced relationship to the gear 24 which is fixed upon the clutch shaft 26 (not shown). Between the snap ring 48 and the bearing 32, which supports the forward end 34 of the main shaft 16, the main shaft is provided with a plurality of teeth or splines 52. Indicated at 54 is a hub of fabric or plastic material, which may be made of any material which is non-resonant and has low sound conducting properties. This material is preferably non-metallic and we have found that materials of this type illustrated by such products as "Celeron" or "Micarta" are well suited to this use. The hub 54 has the internal teeth 56 cut in it, which teeth mate with the teeth 52 on the main shaft to hold the hub against rotation relative to the main shaft while allowing the hub to slide axially along the shaft 16. The outer surface of the hub 54 is cut to form the teeth 58.

Positioned around the hub 54 and having internally cut teeth 60 is a shift collar 62. The internal teeth 60 mate with the external teeth 58 in the hub 54 so that the sleeve 62 will rotate with the hub 54 and shaft 16. At the same time the sleeve 62 is movable axially along the hub 54, and when the teeth 60 extend beyond the faces of the hub 54, they form the internal or female elements of the jaw clutch 40 and are engageable with the male elements 44 formed on the gears 22 and 24. The sleeve 62 is provided with an annular groove 64 around its periphery, which groove is arranged to receive a shift fork (not shown) operable to move the sleeve 62 axially along the hub 54. Various types of shift forks known to the automotive art are operable with our invention, and a particular fork is therefore not shown or described.

While the materials described for use in our hub 54 are not as strong as steel, it will be noted that the continuous contact between all the teeth or splines on the hub 54, shaft 16, and sleeve 62 give a large bearing area so that the bearing pressures are reduced to within the workable limits of the material in the hub.

If the splines 52 in the shaft 16 and the internal teeth 56 in the hub 54 are so cut as to be fairly loose fitting, movement of the collar 62 by the shift fork will first move the hub 54 axially on the shaft 16 until the face of the hub 54 contacts the face of one of the flanges 42. The friction of this contact will have a synchronizing effect tending to equalize the speeds of the hub 54 and the male elements 44 so that as the collar 62 is moved further along the axis of the shaft 16 beyond the hub 54 the internal teeth 60 will be more easily mated with the external teeth 44 and form a driving connection.

It will be noted (see Figures 4 and 5) that every other tooth 60A of the sleeve 62 is milled down at its end so as to be shorter than the other teeth. Likewise, alternate teeth 44A on both the gear 22 and gear 24 are longer than the intermediate teeth 44. This doubles the space within which the male and female gears may be brought into engagement and makes it easier to engage the gears without clashing. After the long teeth of each gear are engaged, the sleeve 62 may be moved further to engage the shorter teeth and increase the bearing area for carrying the load.

In Figure 6 is illustrated a modified type of structure which is interchangeable in the preferred assembly of our invention just described. In the modified structure the hub 154 is formed of the same non-resonant material as hub 54 in the preferred assembly and is provided with similar internally cut teeth 156 arranged to mate with the splines 52 on the main shaft 16. The hub 154 is provided with a web portion 155 which connects with a rim portion 162. The rim 162 is cut away on both its faces to provide annular flat faces 157 against which are mounted annular metal rings 158. The rings 158 are secured to the hub 154 by means of a series of rivets 159 passed through the rings and the flange 162 of the hub. Rings 158 are provided with the internally cut teeth 160 which perform the same function as the internal teeth 60 in the preferred form of my invention. The rim 162 of the hub 154 is cut to form the annular groove 164 for receiving the shift fork which moves the hub as in the case of the collar 62. Alternate teeth 160A are cut away to facilitate easy engagement of the internal teeth with the external teeth of the gears 22 and 24 as has just been described.

It will be noted that the rim portion 162 of the hub 154 is thicker than the web portion 155, thus forming an annular space 166 along the inside edge of the rings 158. This assures that the teeth 160 may be entirely engaged with the teeth 44 without interference from the web 155. The flat surfaces 157 are recessed slightly from the outer portions of the rim 162, thus forming shoulders 168 which serve to center the rings 158 in their proper position on the hub 154.

While we have described our invention as applying to an automotive transmission and as having the internal or female elements connected to the non-resonant material, our invention may obviously be applied to other uses and constructed with the external or male elements attached to the non-metallic hub.

What we claim is:

1. In a jaw clutch, a shiftable member comprising a hub of non-resonant moulded material, means formed on the periphery thereof for moving said hub along its axis of rotation, and a pair of annular rings having teeth cut therein secured to the side faces of said hub.

2. A jaw clutch having a shiftable member comprising a hub of non-resonant material, an annular groove cut around the periphery of said hub, and metallic rings having teeth cut therein fastened on each face of said hub.

3. A jaw clutch having a shiftable member comprising a hub of non-resonant material, an annular groove cut around the periphery of said hub, and metallic rings having teeth cut therein fastened on each face of said hub, said teeth extending inwardly from said rings.

4. A jaw clutch having a shiftable member comprising a hub of non-resonant material, an annular groove cut around the periphery of said hub, and metallic rings having teeth cut therein fastened on each face of said hub, said teeth being cut on the internal edge of said rings and said hub being cut away adjacent said teeth.

5. In a jaw clutch, a shiftable member comprising a hub of non-resonant material having spaced parallel annular faces formed along the periphery thereof, and a metallic ring having teeth cut therein fastened to a side face of said hub.

NILS ERIK WAHLBERG.
FLOYD F. KISHLINE.